3,376,145
CLAY PRODUCTS AND THE LIKE
William K. Wallace, Casper, Wyo., assignor to Benton Clay Co., Casper, Wyo., a corporation of Wyoming
No Drawing. Filed June 14, 1963, Ser. No. 287,753
8 Claims. (Cl. 106—38.28)

This invention relates to clay products and the like and particularly to clay products used in metal and mineral treating processes.

Very substantial amounts of clay, particularly bentonite, are used and have been used in metal and mineral treating processes. For example, bentonite is and has been a component in foundry sand mixes for many years. Similarly bentonite and other clays have been used and are being used as balling clays for taconite ore pelletizing. In all of these mineral and metal treating operations the excess amounts of salts in the clays seriously affect the physical properties of the foundry cores and molds and the stability of the dispersed phase in water and particularly in foundry slurries.

I have discovered that the addition of small amounts of activated charcoal will materially improve the stability of the dispersed clay phase in water being added to the foundry sands and will promote stability of the entire foundry sand system.

I have discovered that the addition of activated charcoal makes clays and particularly bentonite compatible with modern synthetic resin core oils containing furfural which have heretofore been incompatible.

I have also discovered that the addition of a small amount of a chelating agent such as tetra sodium pyrophosphate will markedly increase the effectiveness of the charcoal addition in holding excess salts and other substances present in foundry sand and preventing their deleteriously affecting the stability of the clay phase in the water system of the foundry sand.

The present invention has made it possible to cast intricate metal sections in thinner sections and with finer surfaces than heretofore possible. For example, in the automotive industry the competition of light alloy motor blocks of aluminum has made it necessary to go to cast iron blocks of thinner section. This has created problems in coring the blocks to get a smooth surface on the inside of the water jacket. Burn in of sand, roughness and veining have been great sources of trouble. The practice of the present invention eliminates these problems and permits casting of such blocks with clean smooth interiors.

In the practice of my invention, I preferably add 10 to 12 ounces of activated charcoal per ton of clay for bonding foundry sand in ordinary circumstances, although as little as 4 to 5 ounces has been successful. Higher amounts, up to as much as 25%, have been used successfully in certain applications where synthetic resins and particularly furfural resins are used as the bonding agent. The activated charcoal should be finely divided, preferably minus 325 mesh U.S. Sieve size, and should be intimately admixed with the clay by grinding or dry blending.

Preferably we also add 5 to 10 ounces of tetra sodium pyrophosphate or similar chelating agent per ton of clay containing activated charcoal. This addition of chelating agent improves the effects attained by the activated charcoal but is not essential to the practice of the invention.

The practice of this invention may perhaps be best understood by reference to the following examples.

Example I

A 1500 lb. sand mix containing 20 pints of polymer oil, 3 lbs. of urea furfural resin mixed with 2 lbs. of bentonite containing 25% charcoal, and 2% of water on the sand was mixed for seven minutes. Motor block cores were made with the mixture and motor blocks were cast. The resulting castings were clean and smooth and free of deleterious veining. Similar blocks cast with the identical admixture but without the activated charcoal were seriously veined, rough and showed sand burn-in to a degree that made them unsatisfactory.

Example II

Taconite concentrate fines were admixed with bentonite clay in proportions of 0.60% bentonite on the taconite. The bentonite contained 10 ounces of minus 325 mesh activated charcoal per ton of clay. The mixture was balled. The resulting green strength and dry strength properties were 50% to 75% higher than like balled taconite absent the charcoal.

Example III

Taconite concentrate fines were mixed with bentonite clay in the proportion of twelve pounds of bentonite per ton of ore. The bentonite contained one pound of minus 325 mesh activated charcoal and 5 ounces of tetra sodium pyrophosphate per ton of clay. The mixture was balled. The green strength and dry strength were about 75% higher than like balled taconite absent the charcoal.

Example IV

A 1000 lb. batch of Ottawa core sand was mixed with 1.5% of a blown linseed oil base fast drying core oil by weight, and 2 lbs. of bentonite containing 5 ounces of minus 325 mesh activated charcoal per ton of bentonite. Valve bodies were cast in gray iron using cores made from this mix and an identical mix absent the charcoal. The bodies made from the charcoal containing mix were clean and smooth in the cored portions and free from sand burn-in. Those made from the mixture without activated charcoal showed sand burn-in and undesirable surface imperfections.

Example V

A 1200 lb. sand mix of Ottawa core sand was mixed with 15 lbs. of a blown linseed oil base fast drying core oil and 1.8 lbs. of bentonite containing 12 ounces of minus 325 mesh activated charcoal and 10 ounces of tetra sodium pyrophosphate per ton of bentonite. Cores were formed of this mix and an identical mix absent the activated charcoal. The cores were used to cast cored test pieces. The cores were shaken out and the bodies inspected. Those which were made from cores containing activated charcoal were uniformly smooth, clean, free from veining and sand burn-in. Those cast from the cores without charcoal showed veining, sand burn-in and general surface roughness.

Test results have shown that foundry sand compositions and balling clay-ore compositions according to my invention have about one half the hot deformation at 2000° F. as like compositions without activated charcoal. This quality gives the highly desirable property of greater rigidity to the interface sand next to the casting skin.

While I have described and illustrated certain preferred embodiments and practices of my invention in the foregoing specification, it will be understood that this invention may be otherwise embodied within the scope of the following claims.

I claim:

1. A clay material for metal and mineral treating purposes consisting essentially of an admixture of a major portion of clay and a minor portion of finely divided activated charcoal and containing 5 to 10 ounces of tetra sodium pyrophosphate per ton of admixture.

2. A clay material as claimed in claim 1 wherein the activated charcoal is minus 325 mesh.

3. In a foundry sand mixture containing clay the improvement comprising the addition of activated charcoal.

4. A foundry sand mixture of sand and bentonite having about 4 ounces to 500 lbs. of activated charcoal per ton of bentonite.

5. A foundry sand mixture consisting essentially of sand, drying oils and bentonite in usual proportions, said bentonite containing about 4 ounces to 16 ounces of activated charcoal per ton of bentonite.

6. A foundry sand mixture consisting essentially of sand, synthetic polymerizable resins and bentonite in usual proportions, said bentonite containing about 5% to 25% by weight of activated charcoal.

7. A foundry sand mixture as claimed in claim 6 containing 5 to 10 ounces of tetra sodium pyrophosphate per ton of bentonite-charcoal mixture.

8. A mineral ore balling mixture comprising mineral ore fines and bentonite, said bentonite containing about 4 ounces to 16 ounces of activated charcoal per ton of bentonite.

References Cited

UNITED STATES PATENTS

| | | | |
|---|---|---|---|
| 1,787,964 | 1/1931 | Wallace | 106—38.28 |
| 2,890,504 | 6/1959 | Daley et al. | 22—147 |
| 2,956,890 | 10/1960 | Casteras | 106—38.22 |
| 2,880,099 | 3/1959 | Audrieth | 106—73 |
| 2,976,162 | 3/1961 | Ehdahl | 106—71 |
| 3,070,991 | 1/1963 | Holbrook et al. | 72—38 |

FOREIGN PATENTS 710,099  6/1954  Great Britain.

ALEXANDER H. BRODMERKEL, *Primary Examiner.*

L. H. GASTON, *Examiner.*

J. B. EVANS, *Assistant Examiner.*